Figure 1:
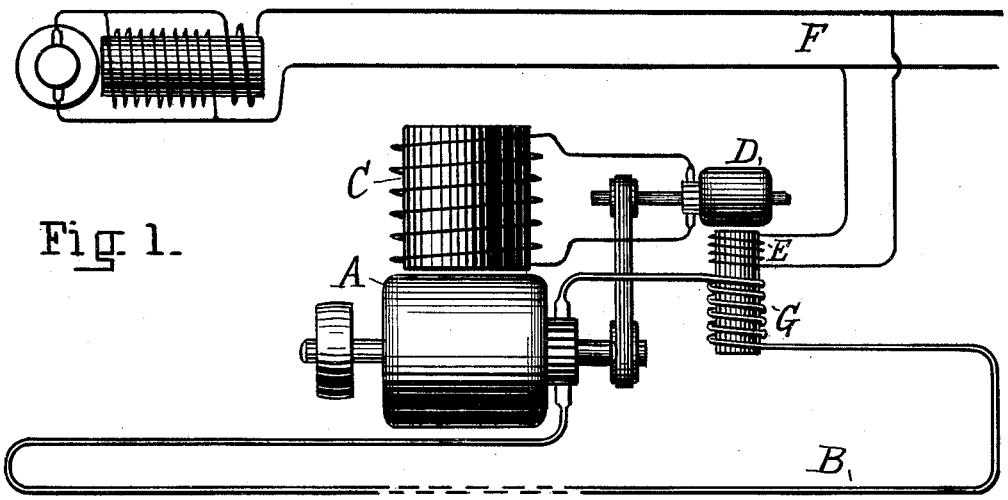

(No Model.) 2 Sheets—Sheet 1.

G. S. DUNN.
INDIRECT REGULATION OF DYNAMO ELECTRIC MACHINERY.

No. 591,344. Patented Oct. 5, 1897.

Witnesses:
Samuel W. Balch
H. H. Whitman

Inventor,
Gano S. Dunn,
by Thomas Ewing, Jr.,
Attorney (No Model.) 2 Sheets—Sheet 2.

G. S. DUNN.
INDIRECT REGULATION OF DYNAMO ELECTRIC MACHINERY.

No. 591,344. Patented Oct. 5, 1897.

Witnesses:
Samuel W. Balch
H. H. Whitman

Inventor,
Gano S. Dunn,
by Thomas Ewing, Jr.,
Attorney

UNITED STATES PATENT OFFICE.

GANO S. DUNN, OF EAST ORANGE, NEW JERSEY, ASSIGNOR TO THE CROCKER-WHEELER ELECTRIC COMPANY, OF NEW JERSEY.

INDIRECT REGULATION OF DYNAMO-ELECTRIC MACHINERY.

SPECIFICATION forming part of Letters Patent No. 591,344, dated October 5, 1897.

Application filed July 10, 1896. Serial No. 598,692. (No model.)

*To all whom it may concern:*

Be it known that I, GANO S. DUNN, a citizen of the United States of America, residing at East Orange, county of Essex, State of New Jersey, have invented certain new and useful Improvements in Indirect Regulation of Dynamo-Electric Machinery, of which the following is a specification.

One object of my invention is to supply a constant current under a varying load—i. e., under varations in the amount of energy to be supplied to the line. The circuit supplied with constant current will be called the "main" circuit. Another object is to regulate a motor so that it will run at a constant speed under varying load if its armature is connected in a constant-current circuit. I do not in this application claim, specifically, my invention as applied to the regulation of motors, as that is claimed in my other application, filed June 22, 1897, Serial No. 641,786. I obtain a constant current under varying load in the main circuit by means of a source of constant potential, and a machine the voltage of which is automatically regulated to vary simultaneously and in the same direction with the load. This machine may generate the entire current supplied to the main circuits, or its armature may be connected up to the constant-potential source and by adding to or cutting down the voltage thereof cause a constant current to be delivered to the main circuit. I shall call this machine the "regulated" machine. To effect the result aimed at, I supply a field-circuit for the regulated machine, in which is connected the armature of a regulating dynamo-electric machine, which acts either as a motor or an exciter. I also supply means dependent upon the constant-potential source for exciting the field of the regulated machine, and a field-coil for the regulating-machine, which is connected in the main circuit, the variations of which regulate the current supplied to the field of the regulated machine, or I provide means dependent upon the current in the main circuit for varying and reversing the field of the regulated machine. The variations are opposite, an increase of current in the main circuit being accompanied by a decrease in the field of the regulated machine, and vice versa. The arrangement is such that a small change in the current of the main circuit corresponds to a large change in the field of the regulated machine, so that the current supplied to the main-circuit current is, practically speaking, constant under varying load. I obtain a constant speed for a motor the armature of which is in a constant-current circuit with certain arrangements of the apparatus herein described, as will be hereinafter explained.

Figure 2:
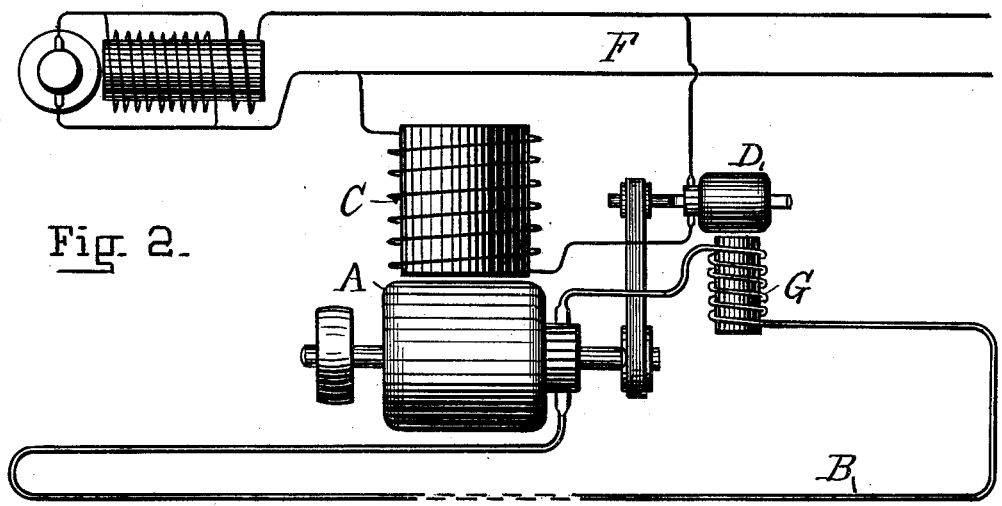
Figure 3:
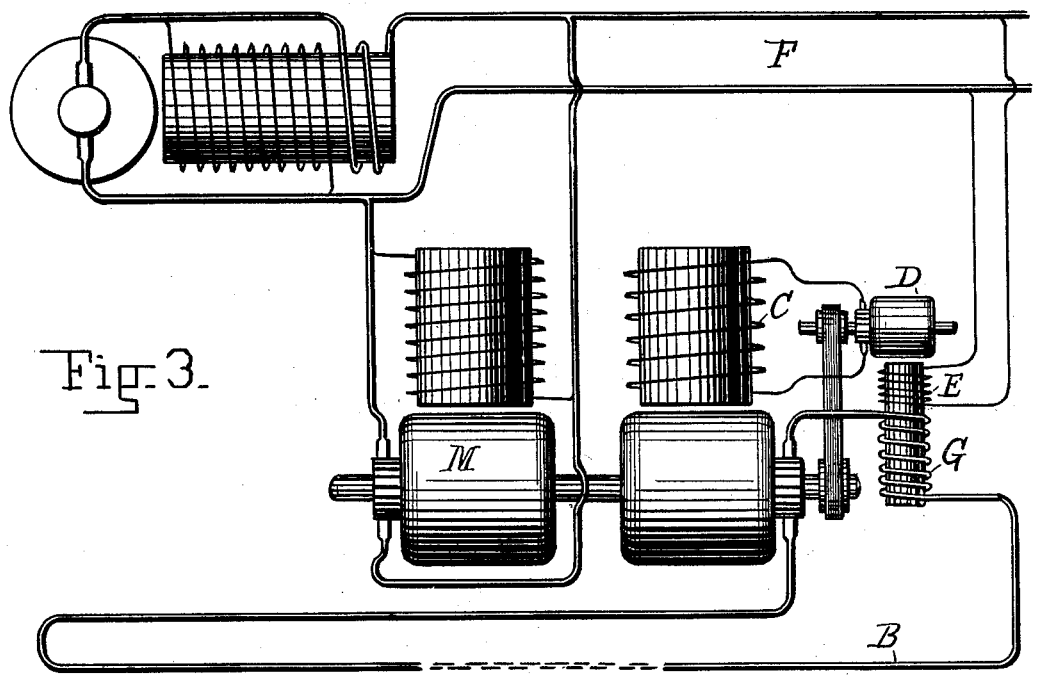
Figure 4:
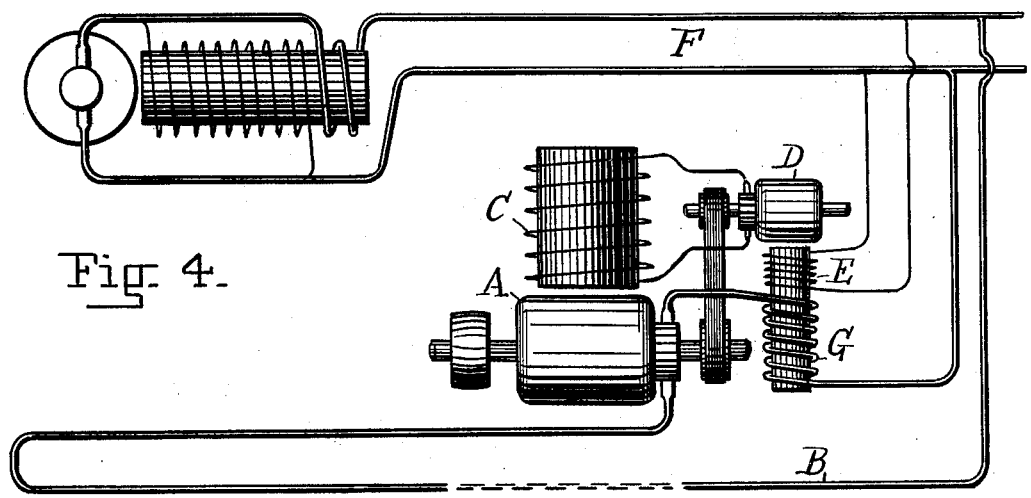

In the accompanying drawings, which form a part of this specification, Figures 1, 2, and 3 are diagrammatic views illustrating arrangements in which the regulated machine itself supplies the constant current, and the arrangement of Fig. 2 can also be used as a constant-speed motor. Fig. 4 is a diagrammatic view illustrating a modification of Fig. 1, in which the regulated machine modifies the output of the constant-potential source into a constant current under varying load.

It will be convenient to describe and discuss the forms shown in Figs. 1, 2, and 3 and then to discuss that of Fig. 4.

With the forms illustrated in Figs. 1, 2, and 3 the field of the regulated machine may have two separate coils, which have a resultant magnetization in the same direction at all loads, one being independent of the regulating-machine and preferably supplied from the constant-potential source and the other being dependent on the regulating-machine. Referring first to Fig. 1, the regulated machine has its armature A in the main circuit B and its field C in series with the armature D of the regulating-machine. This machine has two field-coils, one, E, connected to the constant-potential circuit F, and the other, an opposing field-coil G, connected in the main circuit B. These two field-coils oppose each other, and E is normally the stronger of the two. The output of the machine D varies with the resultant field. As the armature is practically short-circuited a large current will be generated even though the field be weak. In Fig. 2 the armature A of the regulated machine is in the main circuit B. Its field C is connected to the constant-potential circuit F in series with the armature D of the regulating-machine, which has a field G connected in the main circuit. This arrangement can be used to make the regulated machine a generator of constant current under varying load or a motor which shall run at constant speed under varying load if its armature is supplied with a constant current. If it be assumed that the armatures of the regulating and the regulated machines are coupled together, as they should be, then the discussion of the arrangement of this figure given hereinafter applies equally whether the regulated machine is a generator or a motor. If the regulated machine is a generator and the current diminishes with increase of load on the main circuit, then the field of the regulating-machine is weakened and its counter electomotive force falls off. If the regulated machine is a motor, with its armature in a constant-current circuit and its speed diminishes with increase of load, then the speed of the armature of the regulating-machine diminishes and its counter electromotive force falls off. In Fig. 3 the armature of the regulated machine A is connected to the main circuit B. Its field C is connected in series with the armature D of the regulating-machine. This machine has two field-coils, one, E, connected to the constant-potential circuit F, and the other, an opposing field-coil G, connected in the main circuit. The armatures of the regulated and regulating machines are coupled to the armature of a shunt-wound motor M, which is connected to the constant-potential circuit F. In other respects the arrangement of Fig. 3 operates as that of Fig. 1. Fig. 3 merely shows a convenient way of driving the apparatus shown in Fig. 1. The apparatus shown in Fig. 2 may be driven in like manner by coupling the armatures of the regulating and regulated machines to the armature of a shunt-wound motor which is connected in the constant-potential circuit. In both of these forms it is advantageous to have the armature of the regulating-machine make more revolutions per second than the armature of the regulated machine. In any arrangement the armatures of the regulated and the regulating machines should be preferably coupled together. Where the regulated machine is to be used as a generator of constant current, the armature is revolved at a constant speed by the driving mechanism. In each form shown the field of the regulated machine is excited normally by means dependent upon the constant-potential circuit. The means controlled by the constant-current circuit acts merely in opposition. In the form shown in Fig. 1 the field supplied by the constant-potential circuit would, if unopposed, be greatly larger than is necessary to cause the exciter to fully charge the field of the regulated machine. The field supplied by the constant-current circuit would, if unopposed, be almost as large as that due to the constant-potential source. The resultant field of the exciter is the difference between these two fields. Therefore a change of a few per cent. in the constant current will cause a large change in the resultant field of the exciter and hence produce a large change in the field of the regulated machine. In the form shown in Fig. 2 the constant-potential circuit is capable of supplying a quantity of energy greatly larger than is necessary to fully charge the field of the main generator. The efficiency of the regulating-machine should be so high that most of this energy is consumed in its armature. Enough current is allowed to flow to properly charge the field of the regulated machine. A very small change in the voltage generated in the armature of the regulating-machine will result in a large change in the field of the regulated machine. Thus, to take a specific case, suppose in the arrangement shown in Fig. 2 the regulating-machine has a counter electromotive force of ninety-seven per cent. Should the current in the main circuit fall so that the motor has a counter electromotive force of only ninety-four per cent., the field of the regulated machine would double in strength. In like manner, in the arrangement of each of the other figures, a fall of a few per cent. in the current of the main circuit may double or treble the field of the regulated machine.

I shall now describe the form shown in Fig. 4. The regulated machine has its armature A driven at constant speed and connected in the main circuit B and its field C in series with the armature D of the regulating-machine. This regulating-machine has two field-coils, one, E, connected to the constant-potential source in a loop across the leads F, and the other, G, connected in the main circuit B. The armature of the main machine and this field-coil of the regulating-machine are in parallel with the field-coil E of the regulating-machine. The regulated machine may, according to the direction of its field, run as a motor, consuming part of the energy supplied from the constant-potential circuit, in which case the energy consumed in it is used in driving the machinery to which the armature is coupled, or it may be driven by this machinery and generate volts which are added to those of the constant-potential source. The field-coils of the regulating-machine should be so related to each other that they will neutralize each other when the normal current is flowing in the main circuit. If the current falls off, the excitation of the constant field-coil of the regulating-machine will predominate. The direction of winding should be such that the field developed for the regulated machine will make it generate volts, which are added to those of the constant-potential source. If, on the other hand, the current in the main circuit should rise above the normal current, the excitation produced by the variable field-coil of the regulating-machine will predominate. The regulated machine will then run as a motor and consume part of the energy of the constant-potential source, opposing a counter electromotive force which cuts down the voltage thereof. For reasons above explained a small change in a field-coil of the regulating-machine produces a large change in the resultant field, and, the armature of the regulating-machine being short-circuited, a disproportionately large current will be developed by it, even with a weak field. Hence small changes in the current in the main circuit effect large changes in the field of the regulated machine and in the voltage developed in its armature. In this respect the arrangement of Fig. 4 acts like that of Fig. 1. Hence the current on the main circuit will remain approximately constant. The arrangement of Fig. 2 can be modified by connecting the armature of the regulated machine to the constant-potential circuit. The discussion of this modification is unnecessary, because it will be clear from the discussion of Figs. 4 and 2, given above. The method of operation is the same and consists in connecting the main circuit to the constant-potential source through the armature of the regulated machine, supplying the field of the regulated machine from a source which is controlled by the current in the main circuit and varying and reversing the amount supplied to the field-coil of the regulated machine, whereby the regulated machine is caused either to increase the voltage of the source of constant potential as the current in the main circuit decreases or to oppose a counter electromotive force to the voltage supplied by the constant-potential source as the current in the main circuit increases, thus keeping the current in the main circuit practically constant.

I do not limit myself to the specific forms of apparatus shown; but

What I claim, and desire to secure by Letters Patent of the United States, is—

1. The combination of a regulated machine, a main circuit to be supplied with constant current, the armature of the regulated machine being connected in the main circuit, a field-circuit for the regulated machine, a regulating-machine the armature of which is connected in this field-circuit, a constant-potential source, means dependent upon the constant-potential source for exciting the field of the regulated machine, a field-coil for the regulating-machine which is connected in the main circuit, the elements being so arranged that the effect of the current from the constant-potential source and the effect of the current in the main circuit oppose each other in the field-circuit of the regulated machine so that its field is a resultant due to the difference between their effects, and varies with changes in the strength of the current in the main circuit, substantially as described.

2. The combination of a regulated machine, a main circuit to be supplied with the constant current, the armature of the regulated machine being connected in the main circuit, a field-circuit for the regulated machine, a regulating-machine the armature of which is connected in this field-circuit, a constant-potential source, means dependent upon the constant-potential source for exciting the field of the regulated machine, and a field-coil for the regulating-machine which is connected in the main circuit, for regulating the current supplied to the field-circuit of the regulated machine and thereby regulating the current supplied to the main circuit under varying load, substantially as described.

3. The combination of a regulated machine, a main circuit to be supplied with constant current, the armature of the regulated machine being connected in the main circuit, a field-circuit for the regulated machine, an exciter the armature of which is connected in this field-circuit, a field-magnet which controls the output of the exciter the strength of which is the resultant of two magnetizing forces opposed to each other, and means for varying the difference between the two magnetizing forces as the current varies in the main circuit, whereby variations in the current of the main circuit are corrected, substantially as described.

4. The combination of a regulated machine, a main circuit to be supplied with the constant current, the armature of the regulated machine being connected in the main circuit, a field-circuit for the regulated machine, an exciter the armature of which is connected in the field-circuit, and a field-magnet for the exciter the strength of which is the resultant of two magnetizing forces opposed to each other, one being constant and the other varying directly with the current in the main circuit, whereby the field of the regulated machine varies with the difference between the constant and the variable magnetizing forces, substantially as described.

5. The combination of a regulated machine, a main circuit to be supplied with constant current, a field-circuit for the regulated machine, a regulating-machine the armature of which is connected in this field-circuit, a constant-potential source connected to the main circuit through the armature of the regulated machine, means dependent upon the current in the main circuit for varying and reversing the field of the regulating-machine with changes of current in the main circuit so that the voltage developed by the regulated machine shall vary with the current in the main circuit, and shall add to or cut down the voltage developed by the constant-potential source, whereby the current in the main circuit is maintained constant, substantially as described.

6. The method of obtaining a constant current upon a main circuit which consists in connecting the said circuit to a constant-potential source through the armature of a regulated machine, energizing the field-magnet of the main regulated machine from a source which is controlled by the current in the main circuit, and varying and reversing the current supplied to the field-coils of the regulated machine, whereby the current on the main circuit is kept constant, substantially as described.

Signed by me, in New York city, this 6th day of July, in the presence of the subscribing witnesses.

GANO S. DUNN.

Witnesses:
CLEVELAND A. DUNN,
ANSON BALDWIN.